US010890759B1

(12) United States Patent
Held et al.

(10) Patent No.: US 10,890,759 B1
(45) Date of Patent: Jan. 12, 2021

(54) AUTOMATED VARIABLE-FOCUS LENS CONTROL TO REDUCE USER DISCOMFORT IN A HEAD-MOUNTED DISPLAY

(71) Applicant: Microsoft Technology Licensing, LLC, Redmond, WA (US)

(72) Inventors: Robert Thomas Held, Seattle, WA (US); Dan Osborn, Woodinville, WA (US); Apriet Kenig, Bellevue, WA (US); Christian Michael Sadak, Seattle, WA (US); Sophia Siyuan Sun, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/685,605

(22) Filed: Nov. 15, 2019

(51) Int. Cl.
  *G02B 27/00* (2006.01)
  *G02B 27/01* (2006.01)
  *G06F 3/01* (2006.01)

(52) U.S. Cl.
  CPC ..... *G02B 27/0093* (2013.01); *G02B 27/0075* (2013.01); *G02B 27/0172* (2013.01); *G06F 3/013* (2013.01); *G02B 2027/0138* (2013.01); *G02B 2027/0185* (2013.01); *G02B 2027/0187* (2013.01)

(58) Field of Classification Search
  CPC ............ G02B 27/0093; G02B 27/0172; G02B 2027/0138; G02B 2027/0187; G02B 27/0075; G02B 2027/0185; G06F 3/013
  See application file for complete search history.

(56) References Cited

U.S. PATENT DOCUMENTS

| 9,905,143 | B1* | 2/2018 | Konttori | G02B 7/04 |
| 10,379,419 | B1 | 8/2019 | Lu et al. | |
| 2015/0022887 | A1 | 1/2015 | Larson et al. | |
| 2015/0103156 | A1 | 4/2015 | Northrup et al. | |
| 2015/0346495 | A1 | 12/2015 | Welch et al. | |
| 2017/0184848 | A1 | 6/2017 | Vallius | |
| 2017/0358136 | A1 | 12/2017 | Gollier et al. | |

(Continued)

OTHER PUBLICATIONS

Berger, et al., "WIM: Fast Locomotion in Virtual Reality with Spatial Orientation Gain & without Motion Sickness", In Proceedings of the 17th International Conference on Mobile and Ubiquitous Multimedia, Nov. 25, 2018, pp. 19-24.

(Continued)

*Primary Examiner* — Muhammad N Edun
(74) *Attorney, Agent, or Firm* — Workman Nydegger

(57) ABSTRACT

Systems and methods for controlling variable-focus functionality to reduce user discomfort in a mixed-reality system implement acts of obtaining a vergence depth of a gaze of a user, determining that the variable-focus lens for providing focus on virtual content viewed by the user is currently configured to provide focus at a depth that differs from the vergence depth, detecting that a triggering condition is present, and, in response to so detecting, selectively dampening an adjustment made to the variable-focus lens. In some implementations, the dampening causes the adjustment made to the variable-focus lens to reconfigure the variable-focus lens to provide focus at a depth that differs from the vergence depth.

21 Claims, 5 Drawing Sheets

(56) References Cited

U.S. PATENT DOCUMENTS

2018/0302556 A1* 10/2018 Baran ................. H04N 19/167
2019/0137758 A1* 5/2019 Banks ................. H04N 13/144

OTHER PUBLICATIONS

Frommel, et al., "Effects of Controller-based Locomotion on Player Experience in a Virtual Reality Exploration Game", In Proceedings of the 12th International Conference on the Foundations of Digital Games, Aug. 14, 2017, 7 Pages.

Johnson, et al., "Dynamic Lens and Monovision 3D Displays to Improve Viewer Comfort", In Journal of Computing Research Repository, Dec. 2015, 19 Pages.

Koulieris, et al., "Accommodation and Comfort in Head-Mounted Displays", In Journal of ACM Transactions on Graphics, vol. 36, No. 4, Jul. 2017, 11 Pages.

Kramida, et al., "Resolving the Vergence-Accommodation Conflict in Head Mounted Displays", In Journal of IEEE Transactions on Visualization and Computer Graphics, vol. 22, Issue 7, Jul. 1, 2016, 17 Pages.

\* cited by examiner

AUTOMATED VARIABLE-FOCUS LENS CONTROL TO REDUCE USER DISCOMFORT IN A HEAD-MOUNTED DISPLAY

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Mixed-reality systems may use one or more on-body devices (e.g., the HMD, a handheld device, etc.). The HMD provides a display that enables a user to view overlapping and/or integrated visual information in whatever environment the user is in, be it a VR environment or an AR environment.

Continued advances in hardware capabilities and rendering technologies have greatly improved how mixed-reality systems render virtual objects. However, the process of immersing a user into a mixed-reality environment creates many challenges, difficulties, and costs, particularly with regard to presenting virtual content such that the user perceives the virtual content in a manner that emulates the way the user perceives real-world objects.

For instance, many mixed-reality systems can cause vergence-accommodation conflict. Vergence refers to the positioning of a person's eyes for viewing an object at a particular distance (often referred to as the vergence depth). For example, a person's eyes both turn inward toward one another to view an object that is near the front of the person. Accommodation refers to the manner in which the lenses of a person's eyes focus on an object at a particular distance to produce a sharp image of the object on the retinas of the person's eyes. Vergence-accommodation conflict occurs when a person's eyes are positioned to view an object at a particular vergence depth while the person's eyes are focused at a depth that differs from the vergence depth.

Many mixed-reality systems are designed with optical systems that focus virtual content (e.g., holograms) at a particular fixed distance (e.g., 1.5 m, 2 m, 2.5 m) from the viewer. Accordingly, a person's eyes should maintain focus at the predefined distance in order to view sharp images of the virtual content, even in situations where the mixed-reality system displays the virtual content to be perceived at vergence depths that differ from the fixed focus distance (e.g., holograms that are presented on real-world objects that are nearer or farther than the fixed focus distance). The discrepancy between the fixed focus distance and the vergence depth causes vergence-accommodation conflict.

Experiencing vergence-accommodation conflict for prolonged periods causes user discomfort, and the amount of discomfort users experience is often related to the magnitude of the conflict (i.e., the magnitude of the disparity between the vergence depth and the focus distance). Although carefully predefining the focus distance may partially ameliorate vergence-accommodation conflict in many situations, a predefined focus distance may limit the versatility of holograms that may be comfortably presented in a mixed-reality system. By way of example, a mixed-reality system with a predefined focus distance of 2 m will cause vergence-accommodation conflict when presenting holograms that are within the reach of the user's hands.

One solution to vergence-accommodation conflict may include implementing one or more variable-focus lenses into the optical systems of mixed-reality systems to cause the focus distance to conform with the vergence depth of presented virtual content. However, variable-focus lenses may cause distortions to real-world and/or virtual objects in visual proximity to the virtual content that is presented in focus. To add more complexity, the specific pattern of these distortions may vary according to the current focal state of the optical system.

Accordingly, there exists a substantial need to improve systems and methods for addressing vergence-accommodation conflict in mixed-reality devices.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include systems and methods for controlling variable-focus functionality to reduce user discomfort in a mixed-reality system. In some instances, a system includes one or more processors, a variable-focus lens for providing focus on virtual content viewed by a user, and one or more computer-readable media having stored computer-executable instructions that are operable, when executed by the one or more processors, to cause the system to perform specified acts. In some embodiments, the acts include obtaining a vergence depth of a gaze of the user, determining that the variable-focus lens is currently configured to provide focus at a depth that differs from the vergence depth, detecting that a triggering condition is present, and, in response to so detecting, selectively dampening an adjustment made to the variable-focus lens. In some implementations, the dampening causes the adjustment made to the variable-focus lens to reconfigure the variable-focus lens to provide focus at a depth that differs from the vergence depth.

In some embodiments, the triggering condition includes a determination by one or more sensors associated with the system that a motion characteristic of the user meets or exceeds a predetermined threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be evident from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1B:
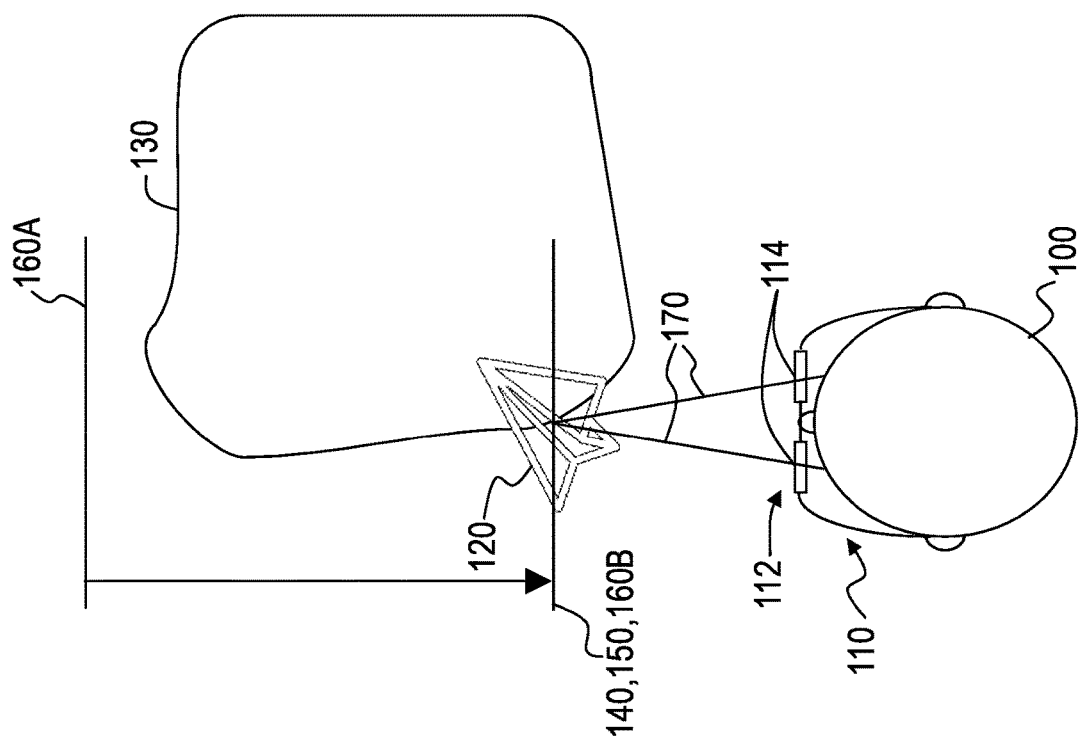
FIG. 1B illustrates a conceptual representation of the mixed-reality system adjusting the variable-focus lens to provide focus at a distance that corresponds with the vergence depth.

Because many mixed-reality systems are designed with optical systems that focus virtual content (e.g., holograms) at a particular fixed distance, many mixed-reality systems cause vergence-accommodation conflict, which occurs when a person's eyes are positioned to view an object at a particular vergence depth while the person's eyes are focused at a depth that differs from the vergence depth. For example, a person's eyes may become positioned to view a hologram of a hand-held object (e.g., a piece of jewelry) at a vergence depth that is closer to the user than a predefined focus distance of a mixed-reality system.

A solution to vergence-accommodation conflict may include implementing one or more variable-focus lenses into the optical systems of mixed-reality systems to cause the focus distance of virtual content to conform with the vergence depth of presented virtual content. However, variable-focus lenses may cause distortions to real-world and/or virtual objects in visual proximity to the virtual content that is presented in focus. For instance, altering the focal length or optical power of a variable-focus lens also alters the magnification of objects perceived through the lens. By way of example, when the focal length of a variable-focus lens decreases, the magnification of objects viewed through the lens increases. In contrast, when the focal length of a variable-focus lens increases, the magnification of objects viewed through the lens decreases.

The change in magnification that results from altering the focal length or optical power of a variable-focus lens may prove disorienting to users. For example, in AR implementations, abrupt changes in magnification may affect the user's perception of surrounding real-world physical objects. An AR system may include a compensating variable-focus lens for the purpose of ameliorating the magnification change in the real-world environment by adjusting the optical power of the compensating variable-focus lens to counteract the optical power of the initial variable-focus lens. However, a pair of counteracting variable-focus lenses will still cause some distortion in at least some AR experiences. For example, the variable-focus lenses may begin to behave as a telescope and cause distortion when the distance between the lenses is sufficient.

Additionally, in VR implementations, magnification changes brought about by adjusting a variable-focus lens may distort virtual content displayed on a screen behind the variable-focus lens. Using a variable-focus lens instead of fixed optics in a VR system may necessitate a plurality of distortion correction modes, each being tailored and preset for different focal-distance configurations for the variable-focus lens. Because defining and presetting a distortion correction mode can be impractical for each and every continuous focal-distance configuration of a variable-focus lens, the various distortion correction modes may need to be discretized, possibly using interpolation to estimate an appropriate distortion correction mode for focal-distance configurations that lie between predefined/preset distortion correction modes. Because estimated distortion correction modes will be imperfect, a variable-focus lens will still cause some distortion in at least some VR experiences.

Accordingly, in some instances, the aforementioned change in magnification can give rise to user disorientation in mixed-reality experiences/environments and may also give rise to safety issues, particularly where the user is in motion.

Disclosed embodiments include systems and methods for controlling variable-focus functionality to reduce user discomfort in a mixed-reality system. A system may include one or more processors, a variable-focus lens for providing focus on virtual content viewed by a user, and one or more computer-readable media having stored computer-executable instructions that are operable, when executed by the one or more processors, to cause the system to perform specified acts. In some embodiments, the acts include obtaining a vergence depth of a gaze of the user, determining that the variable-focus lens is currently configured to provide focus at a depth that differs from the vergence depth, detecting that a triggering condition is present, and, in response to so detecting, selectively dampening an adjustment made to the variable-focus lens. In some implementations, the dampening causes the adjustment made to the variable-focus lens to reconfigure the variable-focus lens to provide focus at a depth that differs from the vergence depth.

In some embodiments, the triggering condition includes a determination by one or more sensors associated with the system that a motion characteristic of the user meets or exceeds a predetermined threshold. In some instances, the triggering condition includes a determination that a visual attribute of a real-world environment satisfies a predefined condition. In other instances, the triggering condition includes a determination that mixed-reality content will be displayed to the user could cause the user to alter their gaze such that a motion characteristic of the user will exceed a predetermined threshold.

Those skilled in the art will recognize that the disclosed embodiments may provide significant improvements over existing systems and methods for addressing user discomfort in mixed-reality systems that include one or more variable-focus lenses. For instance, by selectively dampening the adjustment(s) made to a variable-focus lens in response to detecting a triggering event or condition (e.g., user motion or position, scene complexity/texture density, predicted user motion based on content, etc.), a system may reduce or prevent distortions associated with the variable-focus lens (e.g., magnification changes) that may prove disorienting or even dangerous to users, especially when the user is in a position or performing an action in which a stable perception of the environment may help the user avoid injury.

When the triggering condition is no longer detected as present, the system may cease or refrain from dampening the adjustment(s) made to the variable-focus lens, so as to allow the variable-focus lens to address vergence-accommodation conflict while viewing virtual content through the mixed-reality system. In this regard, at least some of the disclosed embodiments provide a system that balances user safety and comfort with vergence-accommodation conflict correction. For example, when a user is in motion, it may be more important to refrain from distorting the user's perception of their real-world environment than resolving vergence-accommodation conflict, so the system will dampen variable-focus lens adjustments to allow at least some vergence-accommodation conflict to occur, thereby refraining from distorting the user's view of their real-world environment. In another example, when a user is sitting down, distortions to the user's real-world environment may be less important than resolving vergence-accommodation conflict, so the system will refrain from dampening variable-focus lens adjustments to allow the variable-focus lenses to resolve vergence-accommodation conflict (while also causing at least some incidental distortion to objects viewed through the variable-focus lens).

Having just described some of the various high-level features and benefits of the disclosed embodiments, attention will now be directed to FIGS. 1A through 6. These Figures illustrate various conceptual representations, architectures, methods, and supporting illustrations related to controlling variable-focus functionality to reduce user discomfort. The disclosure will then turn to FIG. 7, which presents an example computer system that may be used to facilitate the disclosed principles.

Controlling Variable-Focus Functionality

Figure 1A:
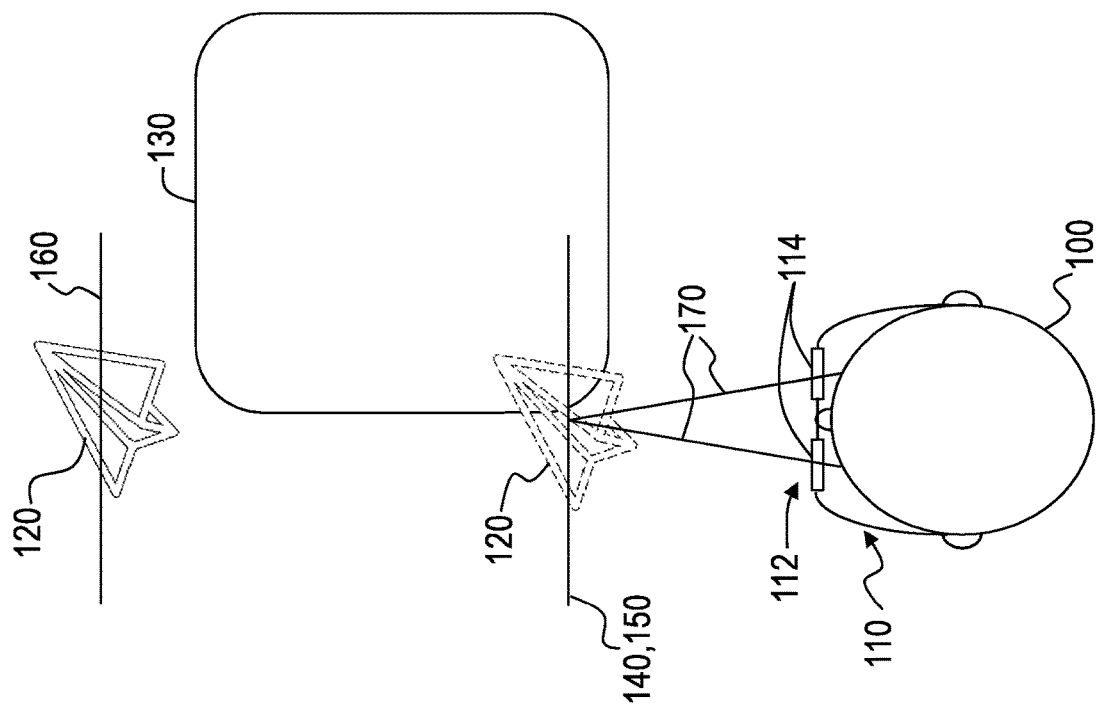
FIG. 1A illustrates conceptual representation of a user operating a mixed-reality system in which a variable-focus lens is configured to provide focus at a distance that differs from the vergence depth.

FIG. 1A illustrates conceptual representation of a user 100 operating a mixed-reality system 110. For simplicity, mixed-reality system 110 shown in FIGS. 1A-5 will be described as an AR system presenting virtual content to the user 100 overlaid on a real-world environment. However, it will be appreciated that the functionalities, principles, and concepts described herein may apply to VR systems as well.

The mixed-reality system 110 includes a display system including an optical system 112 for displaying virtual content (e.g., hologram 120) to the user 100. In AR implementations, the mixed-reality system 110 may display holograms overlain on real-world physical objects/environments (e.g., real-world table 130). In the representation shown in FIG. 1A, the mixed-reality system 110 presents hologram 120 (a virtual representation of a paper airplane, shown in dashed lines) at a particular presentation distance 140 from the user 100. As shown, the eyes of the user 100 direct toward the hologram 120 and therefore turn inward slightly such that the vergence depth 150 of the eyes of the user 100 corresponds with the presentation distance 140 of the hologram 120.

In some implementations, the mixed-reality system 110 includes an eye tracking system that tracks the positioning of the eyes of the user 100 (e.g., by infrared reflection). Based on the position of the eyes of the user 100, the mixed-reality system may determine gaze lines 170 associated with each of the user's eyes and may further determine an intersection of the gaze lines 170. The distance of the intersection point of the gaze lines 170 from the user 100 corresponds with the vergence depth 150. In this regard, a mixed-reality system 110 may obtain the vergence depth 150 by tracking the gaze of the user 100. In other instances, the mixed-reality system 110 predicts a future gaze of the user (e.g., based on virtual content that will be displayed to the user 100 that will likely cause the user 100 to alter their gaze).

In the embodiment represented in FIG. 1A, the optical system 112 includes one or more variable-focus lenses 114. The mixed-reality system 110 may utilize the variable-focus lenses 114 of the optical system 112 to provide focused images to the user 100 of virtual content viewed by the user 100 (e.g., hologram 120). As shown in FIG. 1A, the variable-focus lenses 114 are configured to provide focus of the hologram 120 (shown in solid lines) at a focus distance 160 that differs from the presentation distance 140 and the vergence depth 150. The disparity from the vergence depth 150 and the focus distance 160 gives rise to vergence-accommodation conflict, which may cause discomfort to the user 100.

A variable-focus lens includes an adjustment mechanism for adjusting the focal length, or optical power, of the lens such that the variable-focus lens becomes reconfigured to provide focus (e.g., a sharp image) at a different focus distance. In this regard, a mixed-reality system 110 may determine that the variable-focus lens is currently configured to provide focus at a depth that differs from the vergence depth 150 and utilize the variable-focus lenses 114 to bring the focus distance 160 into conformity with the vergence depth 150 to eliminate vergence-accommodation conflict. FIG. 1B illustrates the mixed-reality system 110 adjusting the focal length of the variable-focus lenses 114 to bring the focus distance from an initial focus distance 160A to a final focus distance 160B that matches the vergence depth 150, such that the eyes of the user 100 perceive a sharp image of the hologram 120 when focused at the vergence depth 150 (hologram 120 being represented as in focus at the vergence depth 150 with solid lines).

Adjustment mechanisms for variable-focus lenses may take on a variety of forms, and no form is limiting to the present embodiments. For instance, variable-focus lenses 114 may include adjustment mechanisms that reconfigure the variable-focus lens by fluid transfer (e.g., transfer different fluids separated by a deformable elastomer), mechanical or piezoelectric actuation (e.g., for altering lens shape or moving elements of a lens block), electrical modulation (e.g., to tune a liquid crystal lens), combinations thereof, or other adjustment mechanisms. In some instances, dampening the adjustment made to the variable-focus lenses 114 includes reducing a voltage applied to the adjustment mechanism.

To facilitate adjustments to the optical power of the variable-focus lens, vergence depth determination, and other functionalities described herein, the mixed-reality system 110 comprises at least one computer system. In its most basic configuration, a computer system includes at least one hardware processing unit and system memory. The system memory may include instructions that are executable by the hardware processing unit to cause the computer system to perform specified functions, such as to cause an adjustment to the focal length, or optical power, of the variable-focus lenses 114, thereby altering the focus distance for objects viewed through the variable-focus lens. Additional details concerning example computer systems are described hereinafter.

As noted hereinabove, adjusting the focal length of a variable-focus lens causes changes in magnification to objects viewed through the lens (e.g., objects surrounding the object of focus). These changes in magnification can prove disorienting and/or dangerous to users. It should be noted that, in AR implementations, the optical system 112 may also include one or more compensating variable-focus lenses that share the same optical axis with the variable-focus lenses 114, such that the compensating variable-focus lenses refract light from the real-world environment toward the eyes of the user 100 through the variable-focus lenses.

In some embodiments, the mixed-reality system 110 adjusts the compensating variable-focus lenses to counteract the adjustments to the variable-focus lenses 114 so as to at least partially ameliorate distortions of the real-world environment caused by the adjustments to the variable-focus lens. Despite the presence of a compensating variable-focus lens, however, distortions to real-world objects may still occur. For example, FIG. 1B illustrates real-world table 130 as becoming distorted, as viewed by the user, while and/or after the mixed-reality system adjusts the variable-focus lens 114 to cause the focus distance 160 to match the vergence depth 150. As mentioned, a distorted real-world environment may present dangers to a user, particularly when the user is locomoting during the mixed-reality experience.

In some embodiments, to reduce user discomfort and increase user safety when using the mixed-reality system 110, the mixed-reality system 110 selectively dampens the adjustment(s) to the variable-focus lenses 114 (and the compensating variable-focus lenses, if present) to reduce or eliminate real-world environmental distortions that might result from an uninhibited adjustment to the variable-focus lenses 114. In VR implementations, the dampening of the adjustment(s) may reduce or eliminate disorienting distortions to virtual content presented on a screen behind the variable-focus lenses 114. In at least some instances, the mixed-reality system 110 selectively dampens the adjustment(s) based on the presence and/or magnitude of a triggering condition.

Figure 2:
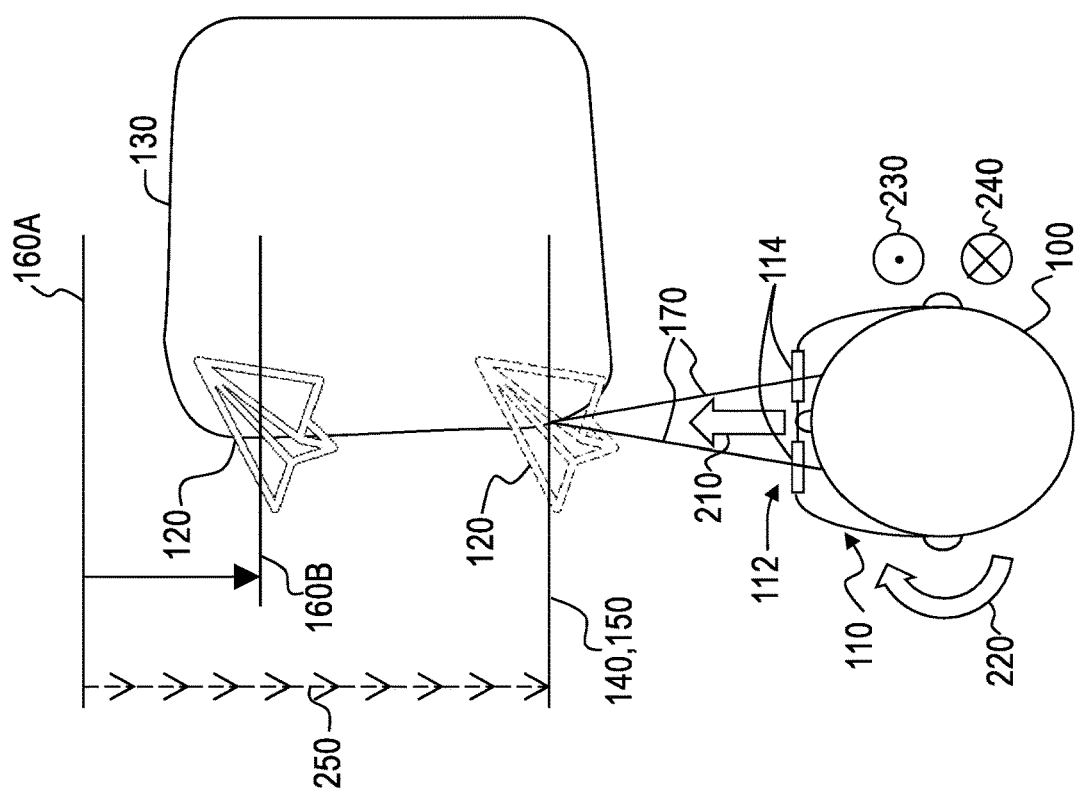
FIG. 2 illustrates a conceptual representation of the mixed-reality system detecting the presence of a triggering condition that includes a motion characteristic of the user.

FIG. 2 illustrates a conceptual representation of the mixed-reality system 110 detecting the presence of a triggering condition that includes a motion characteristic of the user. A user 100 that is in locomotion often relies on a stable perception of their surrounding environment in order to maintain safe control of their locomotion and avoid collision with real-world physical objects. For instance, the user 100 may more successfully avoid a collision with the table 130 by maintaining a stable perception of the positioning of the table 130 with respect to the user 100. Accordingly, the mixed-reality system 110 may treat motion characteristics that meet or exceed a predetermined threshold as triggering events for selectively dampening the adjustments made to the variable-focus lenses 114 (to prevent the distortion that may attend such adjustments).

It will be appreciated that the mixed-reality system 110 may operate with predefined thresholds for various different motion characteristics to trigger the selective dampening of the adjustments to the variable-focus lenses 114. For example, as conceptually represented in FIG. 2, a triggering motion characteristic may include a translational movement of the user 100 (as indicated by forward arrow 210), a rotational movement of the user 100 (as indicated by rotational arrow 220), an ascending movement of the user 100 (as indicated by upward arrow 230), a descending movement of the user 100 (as indicated by downward arrow 240), and/or any combinations thereof. Additional motion characteristics may be considered, such as rapid user eye movement as determined by the eye-tracking system.

It will be appreciated that the directions of the rotational characteristics represented in FIG. 2 are illustrative only and non-limiting. For instance, a translational movement of the user 100 may be in any direction, such as backward, left, or right, and a rotational movement of the user may be about any axis, such as a vertical or horizontal axis. Furthermore, it should be noted that the threshold of a motion characteristic may be defined in various terms, such as the acceleration, velocity, and/or position of the user. By way of non-limiting example, the mixed-reality system 110 may consider a triggering condition present when the translational acceleration of the user 100 meets or exceeds 1 m/s$^2$, the rotational velocity of the user 100 meets or exceeds radians/s, and/or the position of the user 100 indicates that user is in a standing position or pose.

It will also be appreciated that various combinations of thresholds for defining triggering conditions are within the scope of this disclosure. For example, a mixed-reality system 110 may operate to determine that a triggering condition is present upon determining that the user's translational velocity meets or exceeds 2 m/s while the user is in a standing pose, the user's translational velocity meets or exceeds 1 m/s while the user is in a crouching pose, or the user's translational velocity meets or exceeds 0.5 m/s while the user's head is tilted about a vertical or horizontal axis.

In some embodiments, the mixed-reality system 110 obtains the motion characteristics of the user 100 from one or more sensors that are associated with the mixed-reality system 110. By way of example, the motions of the user may be determined by one or more remote or local inertial measurement units, accelerometers, gyroscopes, magnetometers, global positioning systems, cameras (e.g., head-tracking or eye-tracking cameras), acoustic sensors, etc. Additional details regarding sensors that may be associated with a computer system of a mixed-reality system 110 are described hereinafter.

In response to detecting that a triggering condition is present, the mixed-reality system 110 may selectively dampen an adjustment made to the variable-focus lenses 114. By way of example, as shown in FIG. 2, the mixed-reality system 110 has determined that a triggering condition is present based on some combination of translational, rotational, ascending, and/or descending motion/position characteristics meeting or exceeding predetermined thresholds. In response to making this determination, the mixed reality system 110 selectively dampens the adjustment to the focal length of the variable-focus lenses 114 such that the focus distance shifts from an initial focus distance 160A to a final focus distance 160B that differs from the vergence depth 150.

As illustrated in FIG. 2, the dampening causes a disparity to persist between the final focus distance 160B and the vergence depth 150, so vergence-accommodation conflict may exist for the user 100 in motion (though this vergence-accommodation conflict present would be less than would exist between the initial focus distance 160A and the vergence depth 150). FIG. 2 also shows, however, that the table 130 undergoes a smaller degree of optical distortion (as compared with a situation of undampened adjustment to the variable-focus lenses 114) by reason of the dampening of the adjustment to the variable-focus lenses 114. In instances where the user is in motion, some vergence-accommodation conflict may be more acceptable than distorting the user's perception of objects surrounding the virtual content that is in focus (e.g., to prevent user injury). Accordingly, the mixed-reality system 110 may increase user safety and/or reduce user discomfort in situations where the user is in motion.

FIG. 2 also illustrates, by arrow array 250, that the mixed-reality system 110 may vary the degree of the dampening of the adjustment(s) to the variable-focus lenses 114. In some implementations, the mixed-reality system 110 may determine a level of dampening (e.g., as a percentage of dampening) based on a function that includes one or more motion characteristics or other attributes that formed the basis for the presence of the triggering condition (at least some other attributes are discussed hereinbelow with reference to FIGS. 3 and 4). By way of example, the mixed-reality system 110 may apply increased dampening as magnitudes of user locomotion, rotation, changes in position, etc. increase. Conversely, the mixed-reality system 110 may apply decreased dampening as magnitudes of user locomotion, rotation, changes in position, etc. decrease.

Those skilled in the art will recognize that the mixed-reality system 110 may also dampen a compensating adjustment made to a compensating variable-focus lenses in response to detecting that the triggering condition is present. In this way, the mixed-reality system 110 may configure the compensating variable-focus lenses to provide focus that counteracts the dampened adjustments made to the variable-focus lenses 114 (e.g., the compensating variable-focus lenses continue to counteract the adjusted focal configuration of the variable-focus lenses 114).

Figure 3:
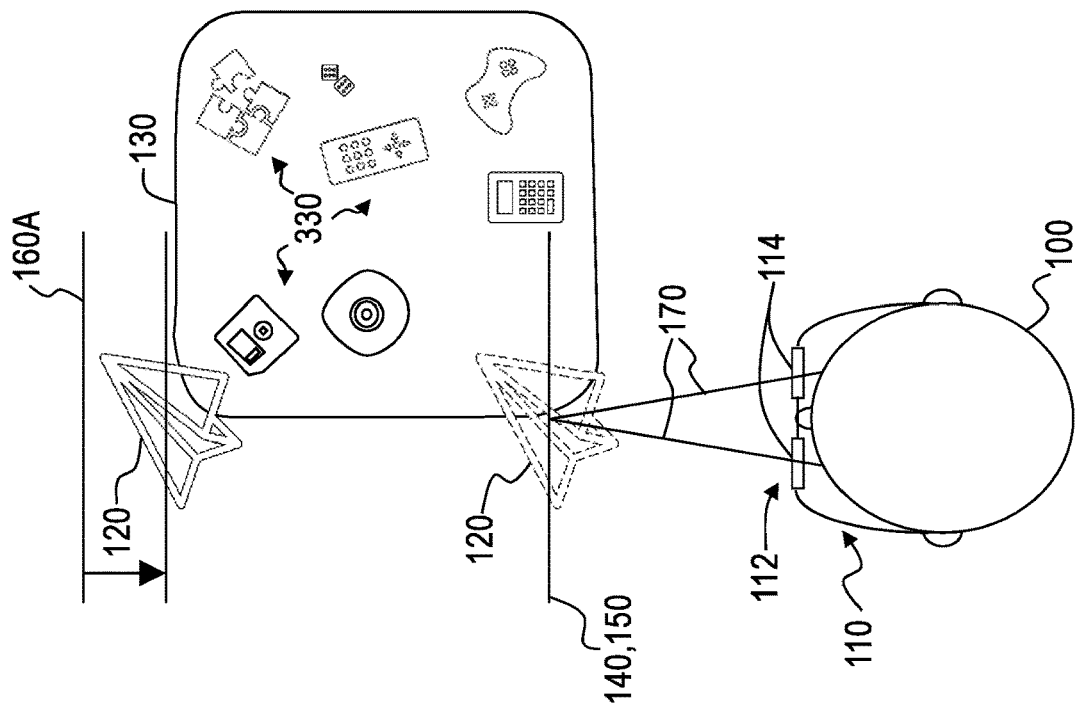
FIG. 3 illustrates a conceptual representation of a mixed-reality system detecting the presence of a triggering condition that includes one or more visual attributes of a surrounding environment.

In some implementations, a triggering condition is based on visual attributes of the surrounding environment of the user (be it a real-world or virtual environment). FIG. 3 illustrates a conceptual representation of a mixed-reality system 110 detecting the presence of a triggering condition that includes one or more visual attributes of a surrounding environment. In some embodiments, a visual attribute that causes a triggering condition is the geometric complexity of the surrounding environment. In situations where the user's surroundings include dense or complex geometries, magnification changes caused by variable-focus lenses may prove disorienting to the user 100.

As shown in FIG. 3, the surrounding environment of the user 100 includes a large number of small real-world physical objects 330 disposed on the table 130. The small real-world physical objects 330 may increase the geometric complexity of the surrounding environment. Accordingly, in response to detecting that the geometric complexity of an environment exceeds a predetermined threshold level of complexity, the mixed-reality system 110 may determine that a triggering condition is present and selectively dampen an adjustment made to the variable-focus lenses 114. FIG. 3 shows that the mixed reality system 110 selectively dampens the adjustment to the focal length of the variable-focus lenses 114 such that the focus distance shifts from an initial focus distance 160A to a final focus distance 160B that differs from the vergence depth 150. The degree of the dampening may depend on the geometric complexity of the environment of the user 100.

Similar to FIG. 2, FIG. 3 shows that the dampening causes a disparity to persist between the final focus distance 160B and the vergence depth 150, so at least a small amount of vergence-accommodation conflict may exist for the user 100 in the geometrically complex scene. FIG. 3 also shows, however, that the table 130 and at least some of the small real-world objects 330 undergo only a small degree of optical distortion because of the dampening of the adjustment to the variable-focus lenses 114. In instances where the user is in a geometrically complex environment, some vergence-accommodation conflict may be more acceptable than distorting the user's perception of complex environment, causing user disorientation and/or discomfort. Accordingly, the mixed-reality system 110 may increase user safety and/or reduce user discomfort in situations where the user is in a complex/dense environment.

A mixed-reality system 110 may determine the geometric complexity of an environment in a variety of ways. In VR implementations, the complexity of an environment may be determined based on, for example, the vertex density or texture complexity/resolution of a 3D mesh, UV map, or 3D model. In AR implementations, the complexity of an environment may be determined based on head-tracking systems (e.g., by the number of identifiable anchor points) and/or depth-tracking systems (e.g., by the complexity of or variation in the depth map of an environment) associated with the mixed-reality system 110.

Aside from geometric complexity, a mixed-reality system 110 may consider other visual attributes of an environment in determining whether a visual attribute of the environment satisfies a predefined condition for effectuating the presence of a triggering condition. For instance, a mixed-reality system 110 may analyze ambient light levels, contrast, proximity of physical obstacles (e.g., determined by depth tracking), and/or other salient visual features of the environment.

Figure 4:
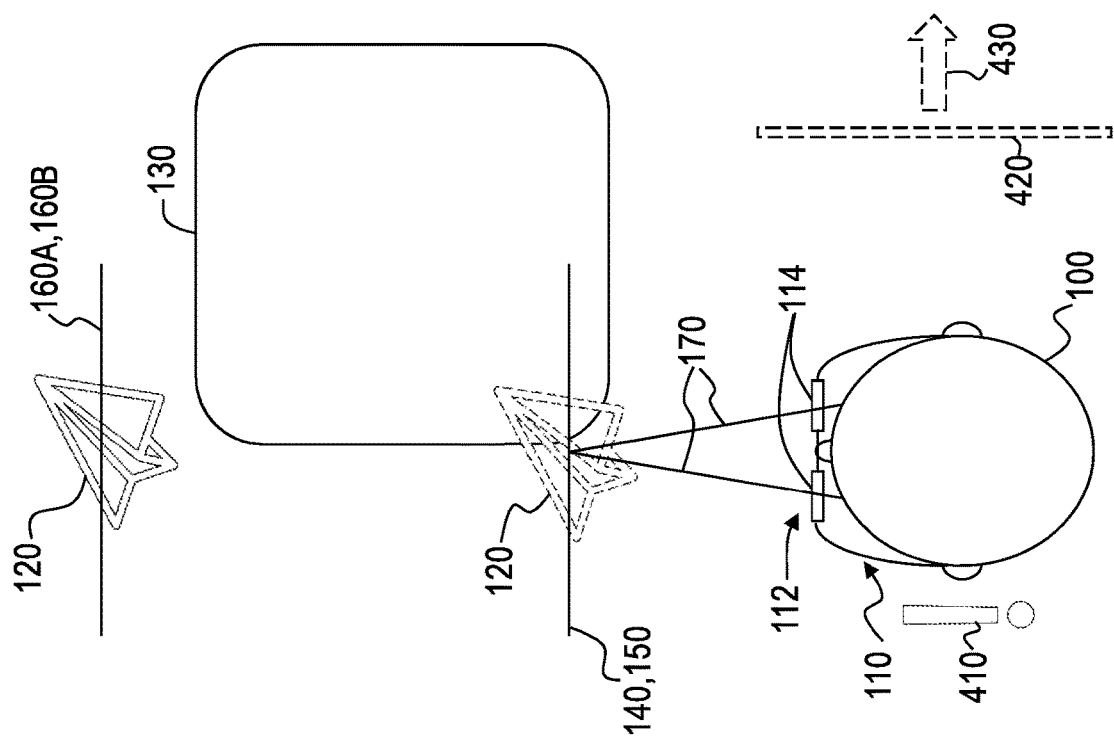
FIG. 4 illustrates a conceptual representation of a mixed-reality system detecting the presence of a triggering condition that includes mixed-reality content that may cause the user to alter their gaze.

In some instances, the presence of a triggering condition is based on the content of the mixed-reality experience. FIG. 4 illustrates a conceptual representation of a mixed-reality system 110 detecting the presence of a triggering condition that includes mixed-reality content that may cause the user 100 to alter their gaze. Mixed-reality content that may cause the user to alter their gaze may also cause the user to change their motion characteristics (e.g., to exceed a predetermined threshold) in a manner that would prove dangerous if the user's perception of their environment were altered by magnification changes associated with focal length changes of the variable-focus lens 114. For instance, exclamation point 410 of FIG. 4 illustratively represents a sound presented as part of a mixed-reality experience that may cause the user 100 to alter their gaze (e.g., a startling or unexpected sound). In another example, the mixed-reality system 110 may present a mixed-reality object 420 in a manner that has a tendency to direct the user's attention toward the mixed-reality object 420 (e.g., presenting it within a peripheral view of the user, as shown in FIG. 4). The mixed-reality object 420 may also be presented in motion, as indicated by arrow 430, or an already presented mixed-reality object may be caused to change position, tending to direct the user to follow the mixed-reality object 420.

Accordingly, in an anticipatory manner, the mixed-reality system 110 may apply dampening to any adjustments made to the variable-focus lenses 114 subsequent to presenting mixed-reality content that may cause the user 100 to alter their gaze.

It will be appreciated that the principles discussed with reference to FIGS. 2-4 may be combined to define triggering conditions that are based on several different components. In one example, the existence of a triggering condition depends on a combination of factors including motion characteristics of the user 100, visual attributes of the environment of the user 100, and the presence or absence of mixed-reality content that may cause the user 100 to change their gaze, position, etc.

In the embodiment shown in FIG. 4, the mixed-reality system 110 dampens the adjustment to the variable-focus lens 114 such that the variable-focus lenses 114 provides focus at a final focus distance 160B that is the same as the initial focus distance 160A at which the variable-focus lenses 114 was initially configured to provide focus before the detection of the triggering condition. Accordingly, in some instances, the dampening applied to the adjustment may amount to 100% dampening, resulting in the mixed-reality system making no adjustment to the variable-focus lenses 114 to correct vergence-accommodation conflict in response to specified triggering conditions. For instance, when newly presented mixed-reality content is likely to cause the user 100 to abruptly accelerate at a high rate, the mixed-reality system 110 may cause 100% dampening as described. 100% dampening may entirely prevent magnification changes to the user's perception of the environment, thereby preventing user disorientation and/or danger that might result from such perceptual distortions.

Figure 5:
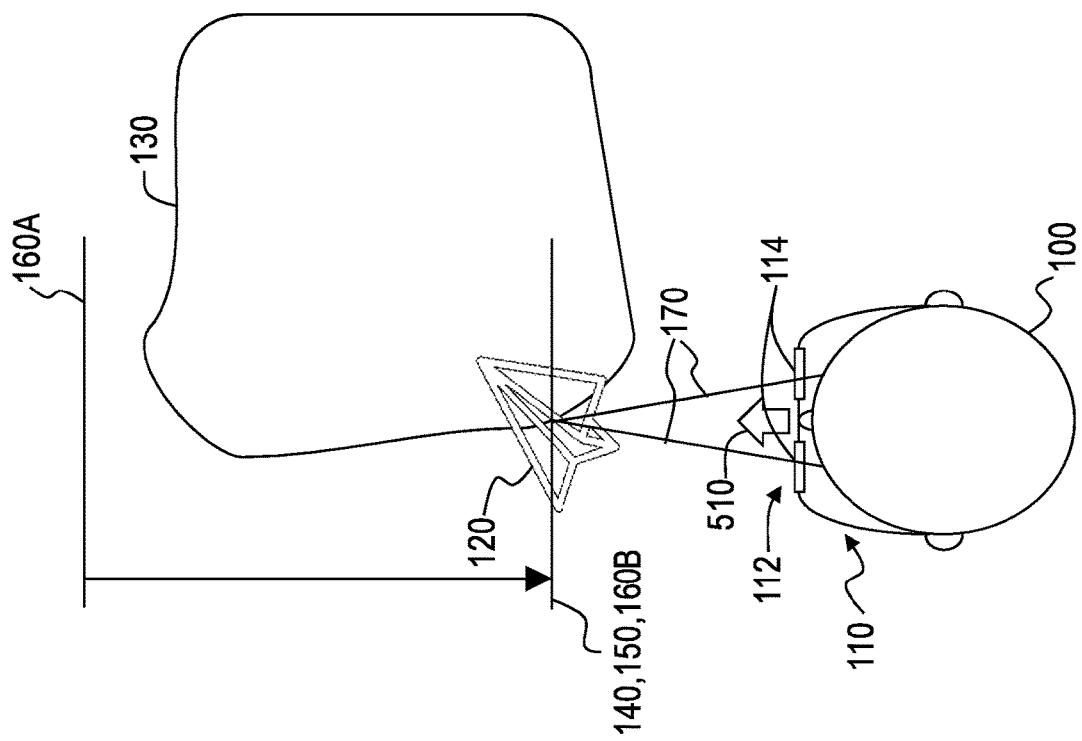
FIG. 5 illustrates a conceptual representation of a mixed-reality system that detects that a triggering condition is no longer present.

After and/or while dampening the adjustment(s) to the variable-focus lenses 114, the mixed-reality system 110 may continue to monitor attributes associated with the mixed-reality experience (e.g., motion characteristics of the user, complexity of the environment, forthcoming mixed-reality content, etc.) to determine whether a triggering condition is still present. FIG. 5 illustrates a conceptual representation of a mixed-reality system 110 detecting that a triggering condition is no longer present. For instance, as represented in FIG. 5 by arrow 510, the mixed-reality system 110 may detect that a translation velocity of the user 100 no longer meets or exceeds a predetermined velocity threshold. As shown, in response to detecting that the triggering condition is no longer present, the mixed-reality system 110 refrains from dampening the adjustment(s) made to the variable-focus lenses 114. Accordingly, the focus distance of the variable-focus lenses 114 is brought from the initial focus distance 160A to a final focus distance 160B that is in alignment with the vergence depth 150, thereby preventing vergence-accommodation conflict. Although table 130 (and possibly other environmental objects not shown) undergo distortion as perceived by the user 100, such distortions may be less likely to result in user disorientation/harm when no triggering conditions are present (e.g., the user is not in locomotion, the environment is not overly complex, etc.).

It will be appreciated that, in some embodiments, when the mixed-reality system 110 detects that a triggering condition is no longer present, the mixed-reality system will also refrain from dampening adjustments made to compensating variable-focus lenses, if present.

In this regard, at least some of the disclosed embodiments provide a system that balances vergence-accommodation conflict avoidance with reducing user disorientation and increasing user safety during mixed-reality experiences.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
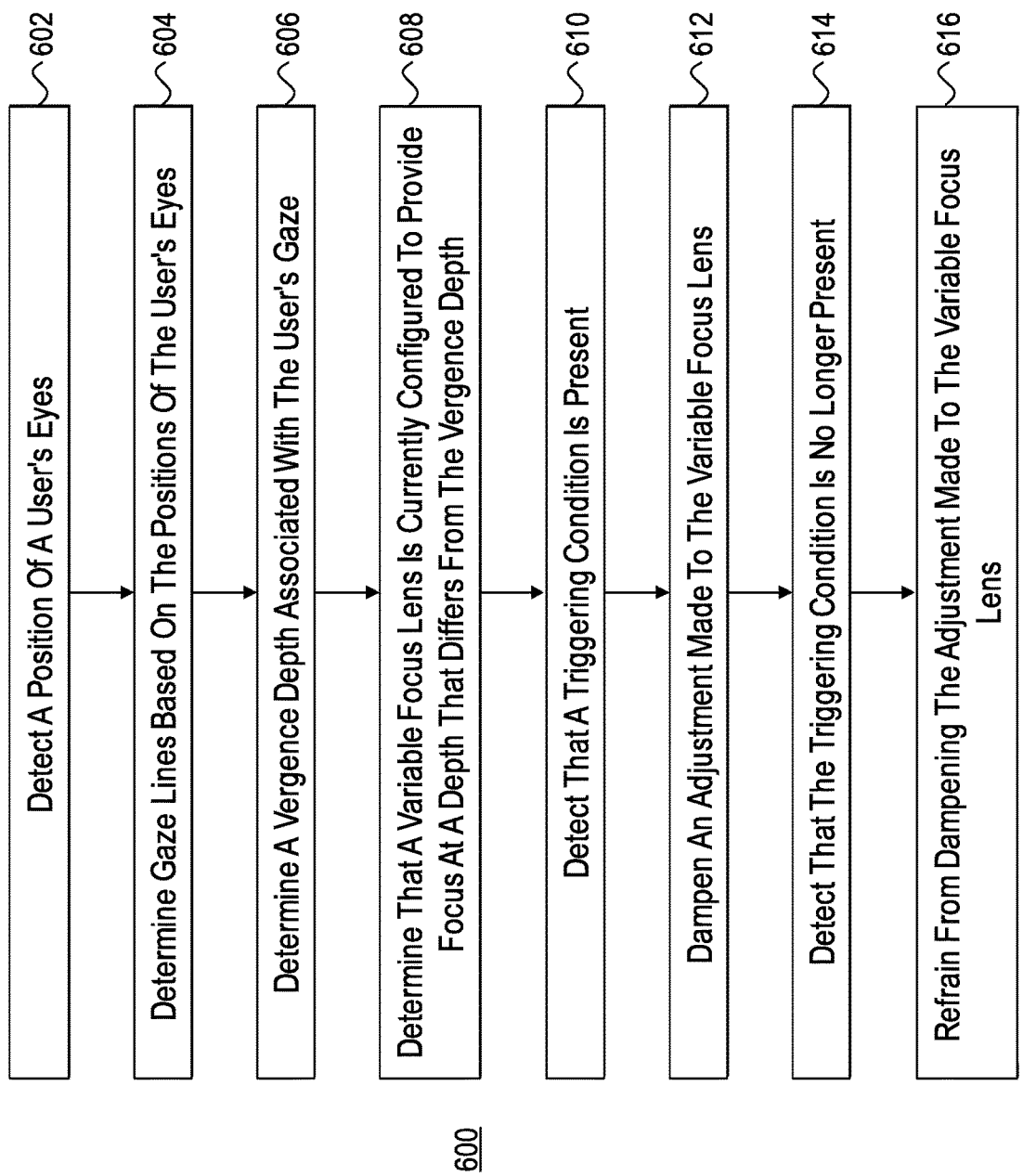
FIG. 6 illustrates an example flow diagram depicting a method for dampening an adjustment made to a variable-focus lens.

As shown in FIG. 6, a flow diagram 600 is provided with various acts associated with methods for dampening an adjustment made to a variable-focus lens. The first illustrated act is to detect a position of a user's eyes (act 602). Act 602 is performed, in some instances, utilizing an eye tracking system associated with a mixed-reality system (e.g., a sensor 720/730 of an HMD, see FIG. 7) that the user is wearing.

The second illustrated act is to determine gaze lines based on the positions of the user's eyes (act 604). The third illustrated act is to determine or otherwise obtain a vergence depth associated with the user's gaze (act 606). In some instances, the vergence depth aligns with one or more virtual objects that the user is viewing as part of a mixed-reality experience. In some instances, a mixed-reality system performs acts 604 and 606 with one or more processors 705 (e.g., by analyzing eye-position data tracked by the eye-tracking system) and stores the obtained vergence depth in memory (e.g., storage 725).

The fourth illustrated act is to determine that a variable-focus lens is currently configured to provide focus at a depth that differs from the vergence depth (act 608). In some instances, the variable-focus lens is one of the display optics 745 of a mixed-reality system for presenting virtual content to a user. When a lens is configured to provide focus at a focus distance that differs from the vergence depth, vergence-accommodation conflict occurs, which may be uncomfortable for users, particularly for long periods of time and/or when the conflict is substantial. However, altering the optical power of the variable-focus lens may have the effect of changing the magnification of objects within the user's field of view (e.g., environmental objects), which may also cause user disorientation and/or danger.

Accordingly, the fifth illustrated act is to detect that a triggering condition is present (act 610). In some embodiments, a triggering condition indicates that a situation exists where the risks associated with magnification changes brought about by adjusting the variable-focus lens to eliminate vergence-accommodation conflict outweigh the benefits of fully eliminating vergence-accommodation conflict. In embodiments, the triggering condition includes a determination by one or more sensors that a motion characteristic of the user meets or exceeds a predetermined threshold (e.g., translational, rotational, positional, etc.), such as determining that the user is in a standing pose or moving with a predefined acceleration or velocity. In some implementations, the triggering condition is based on visual attributes of the user's environment (e.g., geometric complexity, ambient lighting levels, contrast, proximity of real-world objects, etc.) and/or changes in virtual content presented to the user (e.g., presenting new virtual objects, moving existing virtual objects, presenting sounds, etc.) that could cause the user to alter their gaze such that a motion characteristic of the user would exceed a predetermined threshold (thereby presenting the user with a potentially unsafe circumstance). In yet other instances, a triggering condition is based on the proximity of the user to real-world objects.

In some implementations, the presence of a triggering condition is determined based on sensor data obtained by one or more sensors 720/730 associated with a mixed-reality system and/or an input/output interface 710 associated with the mixed-reality system.

The sixth illustrated act is to dampen an adjustment made to the variable-focus lens (act 612). In some implementations, the dampening is selectively performed only in response to detecting that the triggering condition (described with reference to act 610) is present, such that no dampening occurs unless a triggering condition is present. This dampening causes the adjustment made to the variable-focus lens to reconfigure the variable-focus lens to provide focus at a depth that differs from the vergence depth. Dampening the adjustment made to the variable-focus lens may include, for example, reducing a voltage applied to an adjustment mechanism for changing the optical power of the variable-focus lens, such that the voltage applied to the adjustment mechanism is less than a voltage that would be applied to adjust the variable-focus lens to eliminate vergence-accommodation conflict. By dampening the adjustment, at least some vergence-accommodation conflict will exist because the final focus distance of the reconfigured variable-focus lens will differ from the vergence depth, but distortions to the user's perceived environment will also be reduced by the dampening.

In some instances, the dampening causes the adjustment made to the variable-focus lens to cause the variable-focus lens to provide focus at a depth that corresponds with an initial focus distance at which the variable-focus lens was initially configured to provide focus before the detection of the triggering condition. Accordingly, in some instances, the dampening results in no change being made to the focal configuration of the variable-focus lens.

In some implementations, the dampening is effectuated by executing, with one or more processors 705, instructions for reducing the voltage or another adjustment parameter associated with an adjustment mechanism of the variable-focus lens of the display optics 745 of a mixed-reality system.

The seventh illustrated act is to detect that the triggering condition is no longer present (act 614). The detection may be made, in some examples, based on sensor data acquired by sensors 720/730. In some instances, once a triggering condition is no longer present, the benefits of eliminating vergence-accommodation conflict may outweigh the risks associated with magnification changes that attend adjustments to the variable-focus lens to fully eliminate the conflict. Accordingly, the eighth illustrated act is to refrain from dampening the adjustment made to the variable-focus lens (act 616), so as to fully eliminate vergence-accommodation conflict (to the extent possible with the variable-focus lens optics), such as by executing instructions with one or more processors 705 to cease dampening the adjustments made to the variable-focus lenses of the display optics 745 of a mixed-reality HMD.

Those skilled in the art will recognize that act 612 of dampening an adjustment made to a variable-focus lens and act 616 of refraining from dampening the adjustment made to the variable-focus lens may be applied to any number of variable-focus lenses. For instance, these acts may be applied to a left variable-focus lens and a right variable-focus lens of the display optics 745 of a mixed-reality HMD. Additionally, in some embodiments, the dampening and/or refraining from dampening is applied to one or more world-facing variable-focus lenses (e.g., compensating variable-focus lenses) that refract light from a real-world environment toward the eyes of a user through other, user-facing variable-focus lenses.

Example Computer System

Figure 7:
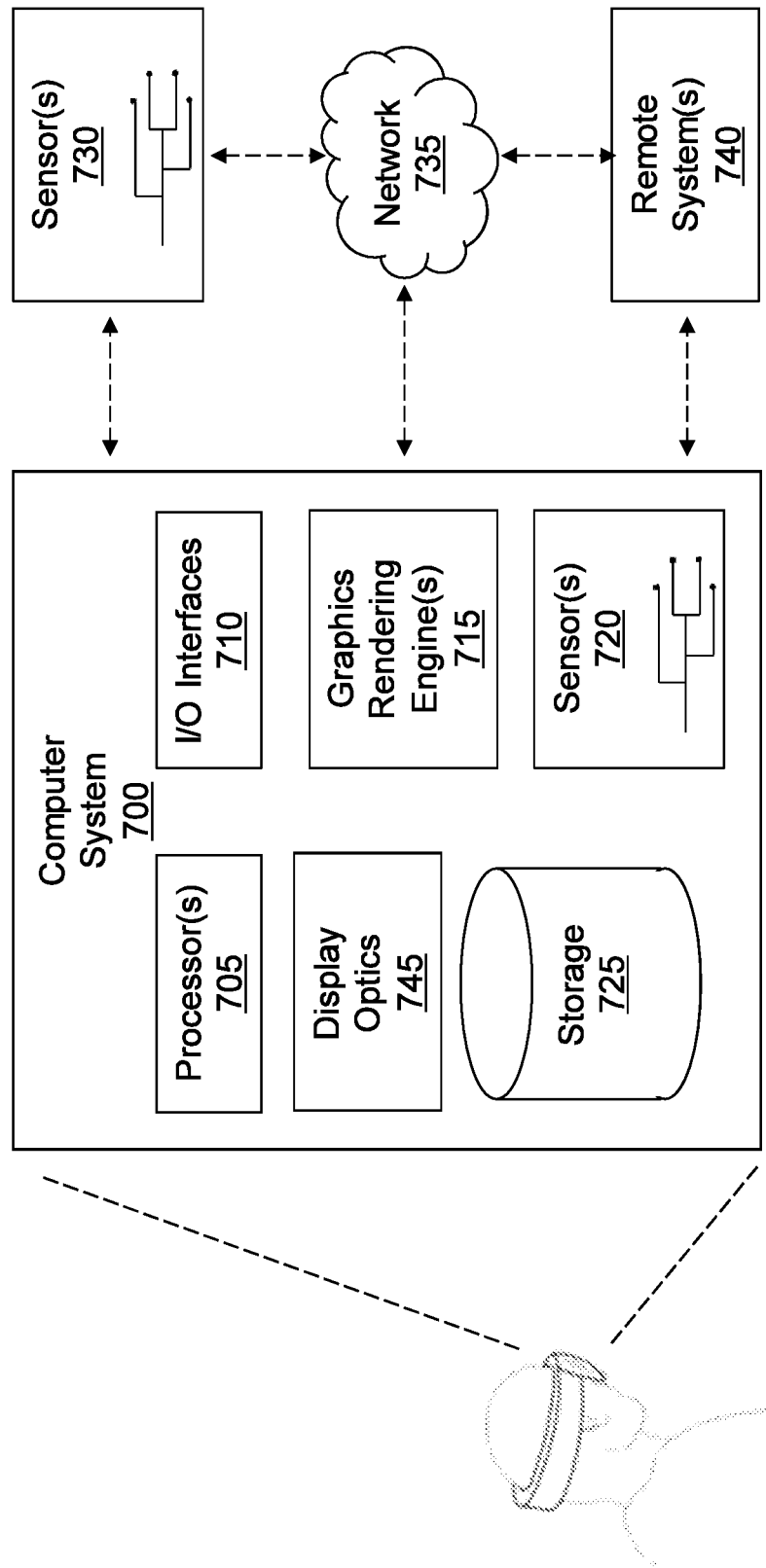
FIG. 7 illustrates an example computer system and components thereof that may be used to implement one or more embodiments disclosed herein.

Having just described the various features and functionalities of some of the disclosed embodiments, the focus will now be directed to FIG. 7 which illustrates an example computer system 700 that may be used to facilitate the operations described herein. In particular, this computer system 700 may be implemented as part of a mixed-reality HMD, as noted hereinabove.

In fact, the computer system 700 may take various different forms. For example, in FIG. 7, the computer system 700 is embodied as an HMD. Although the computer system 700 may be embodied as an HMD, the computer system 700 may also be a distributed system that includes one or more connected computing components/devices that are in communication with the HMD. Accordingly, the computer system 700 may be embodied in any form and is not limited strictly to the depiction illustrated in FIG. 7. By way of example, the computer system 700 may include a desktop computer, a laptop, a tablet, a mobile phone, server, data center and/or any other computer system.

In its most basic configuration, the computer system 700 includes various different components. For example, FIG. 7 shows that computer system 700 includes at least one hardware processing unit 705 (aka a "processor"), input/output (I/O) interfaces 710, graphics rendering engines 715, one or more sensors 720, and storage 725. More detail on the hardware processing unit 705 will be presented momentarily.

The storage 725 may be physical system memory, which may be volatile, non-volatile, or some combination of the two. The term "memory" may also be used herein to refer to non-volatile mass storage such as physical storage media. If the computer system 700 is distributed, the processing, memory, and/or storage capability may be distributed as well. As used herein, the term "executable module," "executable component," or even "component" can refer to software objects, routines, or methods that may be executed on the computer system 700. The different components, modules, engines, and services described herein may be implemented as objects or processors that execute on the computer system 700 (e.g. as separate threads).

The disclosed embodiments may comprise or utilize a special-purpose or general-purpose computer including computer hardware, such as, for example, one or more processors (such the hardware processing unit 705) and system memory (such as storage 725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 700 may also be connected (via a wired or wireless connection) to external sensors 730 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 700 may also be connected through one or more wired or wireless networks 735 to remote systems(s) 740 that are configured to perform any of the processing described with regard to computer system 700.

During use, a user of the computer system 700 is able to perceive information (e.g., a mixed-reality environment) through a display screen that is included among the I/O interface(s) 710 and that is visible to the user. The I/O interface(s) 710 and sensors 720/730 also include gesture-detection devices, eye-tracking systems, and/or other movement-detecting components (e.g., head-tracking cameras, depth-detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 715 is configured, with the hardware processing unit 705, to render one or more virtual objects within the scene. As a result, the virtual objects accurately move in response to a movement of the user and/or in response to user input as the user interacts within the virtual scene. The computer system 700 may include display optics 745 (e.g., mirrors, static or variable-focus lenses, diffractive elements, and/or combinations thereof) for presenting virtual objects within the scene.

A "network," like the network 735 shown in FIG. 7, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 700 will include one or more communication channels that are used to communicate with the network 735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 705). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The disclosed embodiments provide various advantages over traditional HMD systems. Some of these advantages include providing a more robust and accurate depth determination for mixed-reality environments, particularly low-light environments. Additionally, some of these advantages include the ability to track movement (e.g., head movement, hand movement, etc.) in any kind of environment, even low-light environments. Furthermore, by repurposing existing hardware components, such as the head-tracking cameras to additionally perform depth detection, the disclosed embodiments can reduce/simplify the costs, power consumption and form factor of the HMD systems.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured for controlling variable-focus functionality to reduce user discomfort, the system comprising:
   one or more processors;
   a variable-focus lens for providing focus on virtual content viewed by a user; and
   one or more computer-readable media having stored computer-executable instructions that are operable, when executed by the one or more processors, to configure the system to:
      obtain a vergence depth of a gaze of the user;
      determine that the variable-focus lens is currently configured to provide focus at a focus distance that differs from the vergence depth;
      determine that an adjustment is to be made to the variable-focus lens to cause the focus distance to conform with the vergence depth;
      determine whether a triggering condition is present for triggering a dampening of the adjustment; and
      determine whether to dampen the adjustment based on the determination of whether the triggering condition is present, wherein determining whether to dampen the adjustment includes:
         in response to detecting that the triggering condition is present, selectively dampen the adjustment made to the variable-focus lens, the dampening causing the adjustment made to the variable-focus lens to reconfigure the variable-focus lens to provide focus at a focus distance that differs from the vergence depth; or alternatively
         absent making a determination that the triggering condition is present, refrain from dampening the adjustment made to the variable-focus lens to cause the focus distance to conform with the vergence depth.

2. The system of claim 1, wherein the triggering condition includes a determination by one or more sensors associated with the system that a motion characteristic of the user meets or exceeds a predetermined threshold.

3. The system of claim 2, wherein the motion characteristic includes a translational movement of the user.

4. The system of claim 2, wherein the motion characteristic includes a rotational movement of the user.

5. The system of claim 2, wherein the motion characteristic includes a determination that the user is in a standing pose.

6. The system of claim 1, wherein the triggering condition includes a determination by one or more sensor associated with the system that a visual attribute of a real-world environment satisfies a predefined condition.

7. The system of claim 1, wherein the triggering condition includes a determination that mixed-reality content that will be displayed to the user could cause the user to alter their gaze such that a motion characteristic of the user will exceed a predetermined threshold.

8. The system of claim 1, wherein the dampening causes the adjustment made to the variable-focus lens to cause the variable-focus lens to provide focus at a focus distance that corresponds with an initial focus distance at which the variable-focus lens was initially configured to provide focus before the detection of the triggering condition.

9. The system of claim 1, wherein the computer-executable instructions are further operable, when executed by the one or more processors, to cause the system to:
   detect that the triggering condition is no longer present; and
   in response to detecting that the triggering condition is no longer present, refrain from dampening the adjustment made to the variable-focus lens, such that the adjustment made to the variable-focus lens reconfigures the variable-focus lens to provide focus at the vergence depth.

10. The system of claim 1, further comprising an eye-tracking system, the vergence depth of the gaze of the user being determined at least partially based on an intersection of gaze lines detected by the eye-tracking system.

11. The system of claim 1, further comprising a second variable-focus lens positioned to refract light from a real-world environment toward an eye of the user through the variable-focus lens, and wherein the computer-executable instructions are further operable, when executed by the one or more processors, to configure the system to:
   in response to detecting that the triggering condition is present, selectively dampen a second adjustment made to the second variable-focus lens, the dampening causing the second adjustment made to the second variable-focus lens to configure the second variable-focus lens to provide focus that counteracts an adjusted focal configuration of the variable-focus lens.

12. The system of claim 11, wherein the computer-executable instructions are further operable, when executed by the one or more processors, to configure the system to perform the following:
   detect that the triggering condition is no longer present; and
   in response to detecting that the triggering condition is no longer present, refrain from dampening the second adjustment made to the second variable-focus lens.

13. A method for controlling variable-focus functionality to reduce user discomfort, comprising:
   obtaining a vergence depth of a gaze of a user;
   determining that a variable-focus lens for providing focus on virtual content viewed by the user is currently configured to provide focus at a focus distance that differs from the vergence depth;
   determine that an adjustment is to be made to the variable-focus lens to cause the focus distance to conform more closely with the vergence depth than prior to the adjustment;
   determine whether a triggering condition is present for triggering a dampening of the adjustment; and
   determine whether to dampen the adjustment based on the determination of whether the triggering condition is present, wherein determining whether to dampen the adjustment includes:
      in response to detecting that the triggering condition is present, selectively dampening the adjustment made to the variable-focus lens, the dampening causing the adjustment made to the variable-focus lens to reconfigure the variable-focus lens to provide focus at a focus distance that differs from the vergence depth; or alternatively
      absent making a determination that the triggering condition is present, refrain from dampening the adjustment made to the variable-focus lens to cause the focus distance to conform more closely with the vergence depth than prior to the adjustment.

14. The method of claim 13, wherein the triggering condition includes a determination by one or more sensors associated with a computer system that a motion characteristic of the user meets or exceeds a predetermined threshold.

15. The method of claim 13, wherein the triggering condition includes a determination by one or more sensor associated with a computer system that a visual attribute of a real-world environment satisfies a predefined condition.

16. The method of claim 13, wherein the triggering condition includes a determination that mixed-reality content that will be displayed to the user could cause the user to alter their gaze such that a motion characteristic of the user will exceed a predetermined threshold.

17. The method of claim 13, further comprising:
 detecting that the triggering condition is no longer present; and
 in response to detecting that the triggering condition is no longer present, refraining from dampening the adjustment made to the variable-focus lens, such that the adjustment made to the variable-focus lens reconfigures the variable-focus lens to provide focus at the vergence depth.

18. The method of claim 13, wherein the adjustment made to the variable focus lens reconfigures the variable-focus lens to provide focus at the vergence depth.

19. One or more hardware storage devices having stored thereon computer-executable instructions, the computer-executable instructions being executable by one or more processors of a computer system to configure the computer system to:
 obtain a vergence depth of a gaze of a user;
 determine that a variable-focus lens for providing focus on virtual content viewed by the user is currently configured to provide focus at a focus distance that differs from the vergence depth;
 determine that an adjustment is to be made to the variable-focus lens to cause the focus distance to conform with the vergence depth;
 determine whether a triggering condition is present for triggering a dampening of the adjustment; and
 determine whether to dampen the adjustment based on the determination of whether the triggering condition is present, wherein determining whether to dampen the adjustment includes:
  in response to detecting that the triggering condition is present, selectively dampen the adjustment made to the variable-focus lens, the dampening causing the adjustment made to the variable-focus lens to reconfigure the variable-focus lens to provide focus at a focus distance that differs from the vergence depth; or alternatively
  absent making a determination that the triggering condition is present, refrain from dampening the adjustment made to the variable-focus lens to cause the focus distance to conform with the vergence depth.

20. The one or more hardware storage devices of claim 19, wherein the triggering condition includes a determination by one or more sensors associated with the system that a motion characteristic of the user meets or exceeds a predetermined threshold.

21. The one or more hardware storage devices of claim 19, wherein the computer-executable instructions are further operable, when executed by the one or more processors, to configure the computer system to:
 detect that the triggering condition is no longer present; and
 in response to detecting that the triggering condition is no longer present, refrain from dampening the adjustment made to the variable-focus lens, such that the adjustment made to the variable-focus lens reconfigures the variable-focus lens to provide focus at the vergence depth.

* * * * *